United States Patent
Getter et al.

(10) Patent No.: US 9,366,386 B2
(45) Date of Patent: Jun. 14, 2016

(54) LIQUID LEVEL GAUGE FOR A CRYOGENIC FLUID CYLINDER

(71) Applicant: Worthington Cylinders Corporation, Worthington, OH (US)

(72) Inventors: James M. Getter, Sunbury, OH (US); Robert E. Hrncir, Dallas, TX (US)

(73) Assignee: Worthington Cylinders Corporation, Columbus, OH (US)

( * ) Notice: Subject to any disclaimer, the term of this patent is extended or adjusted under 35 U.S.C. 154(b) by 184 days.

(21) Appl. No.: 14/471,813

(22) Filed: Aug. 28, 2014

(65) Prior Publication Data

US 2016/0033082 A1    Feb. 4, 2016

Related U.S. Application Data

(60) Provisional application No. 61/871,087, filed on Aug. 28, 2013.

(51) Int. Cl.
| | | |
|---|---|---|
| *G01F 23/30* | (2006.01) | |
| *F17C 13/00* | (2006.01) | |
| *G01F 23/34* | (2006.01) | |

(Continued)

(52) U.S. Cl.
CPC ............. *F17C 13/001* (2013.01); *F17C 3/02* (2013.01); *F17C 13/02* (2013.01); *F17C 13/021* (2013.01); *G01F 23/34* (2013.01); *F17C 2201/0109* (2013.01); *F17C 2201/058* (2013.01); *F17C 2203/03* (2013.01); *F17C 2203/0391* (2013.01); *F17C 2203/0395* (2013.01); *F17C 2203/0629* (2013.01); *F17C 2205/0165* (2013.01); *F17C 2205/0314* (2013.01); *F17C 2205/0329* (2013.01); *F17C 2205/0394* (2013.01); *F17C 2221/011* (2013.01); *F17C 2221/013* (2013.01); *F17C 2221/014* (2013.01); *F17C 2221/016* (2013.01); *F17C 2221/033* (2013.01); *F17C 2223/0161* (2013.01); *F17C 2223/033* (2013.01);

(Continued)

(58) Field of Classification Search
None
See application file for complete search history.

(56) References Cited

U.S. PATENT DOCUMENTS

| 4,020,690 A | * | 5/1977 | Samuels | ............... G01F 23/16 73/299 |
| 4,637,254 A | * | 1/1987 | Dyben | ............... G01F 23/76 340/624 |

(Continued)

OTHER PUBLICATIONS

LP Gas & Anhydrous Ammonia Equipment Catalog, vol. 8, pp. 267-284, Gas Equipment Company, Inc., Dallas, Texas, undated.

(Continued)

*Primary Examiner* — Andre Allen
(74) *Attorney, Agent, or Firm* — Porter, Wright, Morris & Arthur, LLP

(57) ABSTRACT

A vertically-oriented cryogenic fluid cylinder includes an inner vessel for holding cryogenic fluid, an outer vessel surrounding the inner vessel, and a liquid level gauge for indicating a liquid level within the inner vessel. The liquid level gage includes a level indicator located outside of the outer vessel, a support arm extending down into the inner vessel, a swing arm pivotably secured to the support arm and connected to the level indicator so that angular position of the swing arm provides an indication of liquid level within the inner vessel on the level indicator, and a float on the swing arm that pivots the swing arm as the liquid level rises and lowers. The support arm forms an acute angle with the central longitudinal axis of the inner vessel so that the swing arm can be longer to move over a larger portion of the length of the inner vessel.

12 Claims, 7 Drawing Sheets

(51) Int. Cl.
*F17C 13/02* (2006.01)
*F17C 3/02* (2006.01)

(52) U.S. Cl.
CPC . *F17C 2227/0107* (2013.01); *F17C 2250/0413* (2013.01); *G01F 23/30* (2013.01)

(56) References Cited

U.S. PATENT DOCUMENTS

| | | | |
|---|---|---|---|
| 5,479,820 A * | 1/1996 | Fekete | G01F 23/62 116/285 |
| 6,089,086 A | 7/2000 | Swindler et al. | |
| 2010/0241371 A1* | 9/2010 | Ammouri | F17C 13/021 702/55 |
| 2015/0013350 A1* | 1/2015 | Ames | F17C 1/12 62/48.1 |

OTHER PUBLICATIONS

Taylor Products Gauge Catalog, Rev 7.14, Squib Taylor, Inc., Dallas, Texas, undated.

* cited by examiner

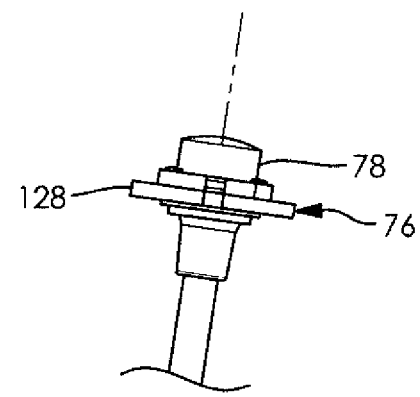
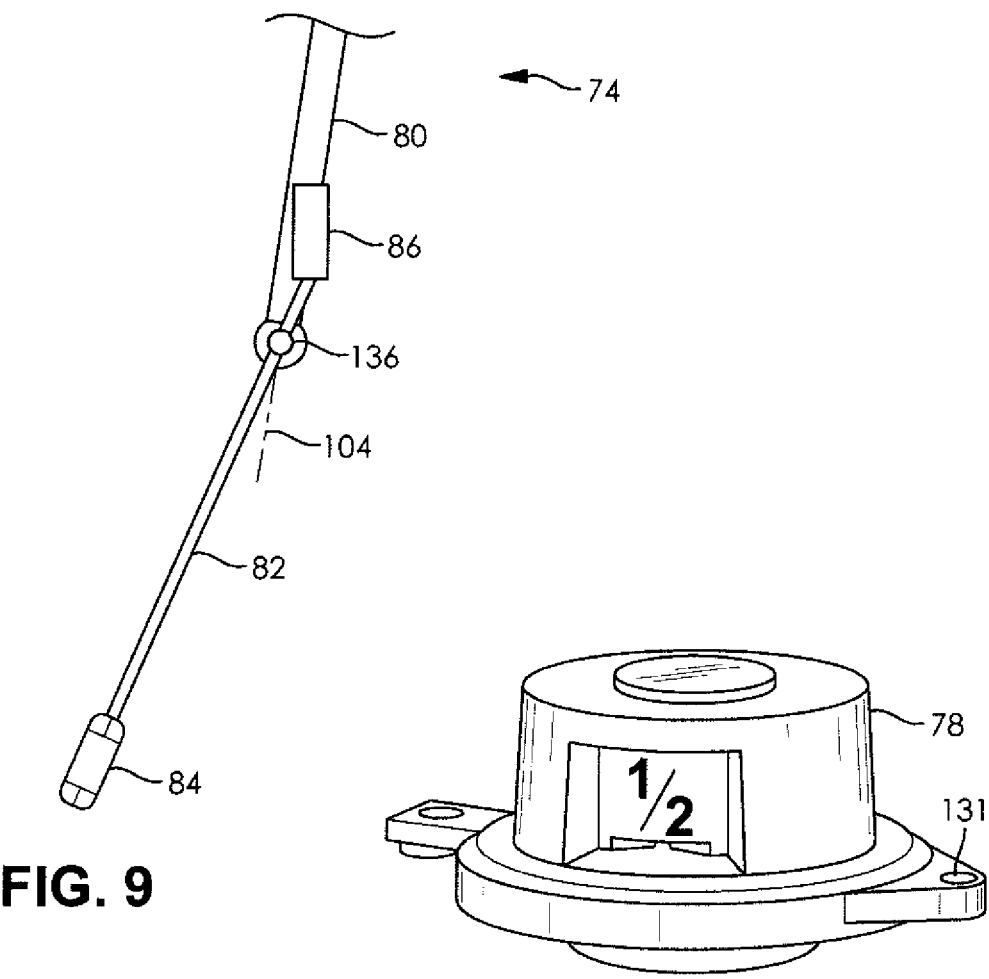
FIG. 9
FIG. 10

LIQUID LEVEL GAUGE FOR A CRYOGENIC FLUID CYLINDER

CROSS-REFERENCE TO RELATED APPLICATIONS

This application claims the priority benefit of U.S. Provisional Patent Application No. 61/871,087 filed on Aug. 28, 2013, the disclosure of which is expressly incorporated herein in its entirety by reference.

STATEMENT REGARDING FEDERALLY SPONSORED RESEARCH

Not Applicable

PARTIES TO A JOINT RESEARCH AGREEMENT

Not Applicable

REFERENCE TO APPENDIX

Not Applicable

FIELD OF THE INVENTION

The field of the present invention relates to storage vessels for cryogenic fluids and, more particularly, to liquid level gauges for such storage vessels.

BACKGROUND OF THE INVENTION

A typical cryogenic storage vessel includes an inner tank for retaining a supply of cryogenic fluid and an outer jacket or tank surrounding the inner tank to protect and thermally insulate the inner tank. Cryogenic liquid is stored in the lower portion of the inner tank while cryogenic gas forms in a head space of the inner tank as the cryogenic gas vaporizes. The outer tank is spaced from the inner tank to create a thermal insulation chamber therebetween. The thermal insulation chamber typically has a vacuum therein so that radiant and conductive heat transfer to the inner tank is reduced in order to reduce vaporization of the cryogenic liquid due to atmospheric thermal input.

Cryogenic storage vessels also often have a liquid level gauge that indicates a level of the cryogenic liquid within the inner tank. The most common type of liquid level gauge used in cryogenic storage vessels is a float-type liquid level gauge in which a float on a swing arm moves a spring-loaded dial as the float lowers and rises with the level of the cryogenic liquid. While these float-type liquid level gauges may perform in an adequate manner in many circumstances, their performance is less than ideal in other circumstances. For example, their performance is less than ideal in vertically-oriented cryogenic fluid cylinders where the longitudinal length of the cylinder is relatively large compared to the lateral diameter of the cylinder because the lateral diameter of the cylinder does not provide enough space so that swing arm can pivot over a desired portion of the length of the cylinder. Solutions have been to accept the less than desirable performance or to use more expensive and/or less reliable types of liquid level indicators. Accordingly, there is a need for improved liquid level gauges for cryogenic fluid storage vessels.

SUMMARY OF THE INVENTION

Disclosed herein are liquid level gauges for cryogenic fluid storage vessels which overcome at least one of the deficiencies of the prior art. Disclosed is a cryogenic fluid storage vessel comprising, in combination, an inner vessel for holding cryogenic fluid, wherein the inner vessel is cylindrical shaped having a diameter and a central longitudinal axis perpendicular to the diameter, an outer vessel surrounding the inner vessel and forming an insulating space therebetween, and a liquid level gauge. The liquid level gauge includes a gauge head secured to the outer vessel, a level indicator viewable from the outside the outer vessel, a support arm extending from the gauge head and extending into the inner vessel, a swing arm pivotably secured to a lower end of the support arm and operatively connected to the level indicator so that angular position of the swing arm provides an indication of liquid level within the inner vessel on the level indicator, and a float secured to the swing arm and configured to pivot the swing arm as level of the liquid within the inner vessel changes. A central longitudinal axis of the support arm forms an acute angle with the central longitudinal axis of the inner vessel.

Also disclosed is a vertically-oriented cryogenic fluid cylinder comprising, in combination, an inner vessel for holding cryogenic fluid, wherein the inner vessel is cylindrical shaped having a laterally-extending diameter and a vertically-extending central longitudinal axis perpendicular to the lateral diameter, an outer vessel surrounding the inner vessel and forming an insulating space therebetween, wherein the outer vessel is cylindrical shaped having a laterally-extending diameter and a vertically-extending central longitudinal axis perpendicular to the lateral diameter and coaxial with the central longitudinal axis of the inner vessel, and a liquid level gauge. The liquid level gauge includes a gauge head secured to a top of the outer vessel, a level indicator viewable from outside of the outer vessel, a support arm extending from the gauge head and extending down into the inner vessel, a swing arm pivotably secured to a lower end of the support arm and operatively connected to the level indicator so that angular position of the swing arm provides an indication of liquid level within the inner vessel on the level indicator, and a float secured to the swing arm and configured to pivot the swing arm as level of the liquid within the inner vessel changes. A central longitudinal axis of the support arm forms an acute angle with the central longitudinal axis of the inner vessel.

Also disclosed is a vertically-oriented cryogenic fluid cylinder comprising, in combination, an inner vessel for holding cryogenic fluid, wherein the inner vessel is cylindrical shaped having a laterally-extending diameter and a vertically-extending central longitudinal axis perpendicular to the lateral diameter, an outer vessel surrounding the inner vessel and forming an insulating space therebetween, wherein the outer vessel is cylindrical shaped having a laterally-extending diameter and a vertically-extending central longitudinal axis perpendicular to the lateral diameter and coaxial with the central longitudinal axis of the inner vessel, a manifold secured to a top of the outer vessel and having internal passages operatively connecting user controls to an interior of the inner vessel and an interior of the outer vessel, and a liquid level gauge. The liquid level gauge includes a gauge head secured to the manifold, a level indicator secured to the gauge head and viewable from outside of the outer vessel, a support arm extending from the gauge head and extending down through the manifold and into the inner vessel, a swing arm pivotably secured to a lower end of the support arm and operatively connected to the level indicator so that angular position of the swing arm provides an indication of liquid level within the inner vessel on the level indicator, and a float secured to the swing arm and configured to pivot the swing arm as level of the liquid within the inner vessel changes. A central longitudinal axis of the support arm forms an acute angle with the central longitudinal axis of the inner vessel From the foregoing disclosure and the following more detailed description of various preferred embodiments it will be apparent to those skilled in the art that the present invention provides a significant advance in the technology and art of liquid level gauges for cryogenic fluid storage vessels. Particularly significant in this regard is the potential the invention affords for providing relatively reliable, accurate, and low cost liquid level gauges for cryogenic fluid storage vessels. Additional features and advantages of various preferred embodiments will be better understood in view of the detailed description provided below.

BRIEF DESCRIPTION OF THE DRAWINGS

These and further features of the present invention will be apparent with reference to the following description and drawings, wherein:

FIG. 9 is an enlarged right-side elevational view of the liquid level gauge of the cryogenic fluid cylinder of FIGS. 1 to 6.

FIG. 10 is a front perspective view of a visual level indicator of the liquid level gauge of FIG. 9.

Figure 1:
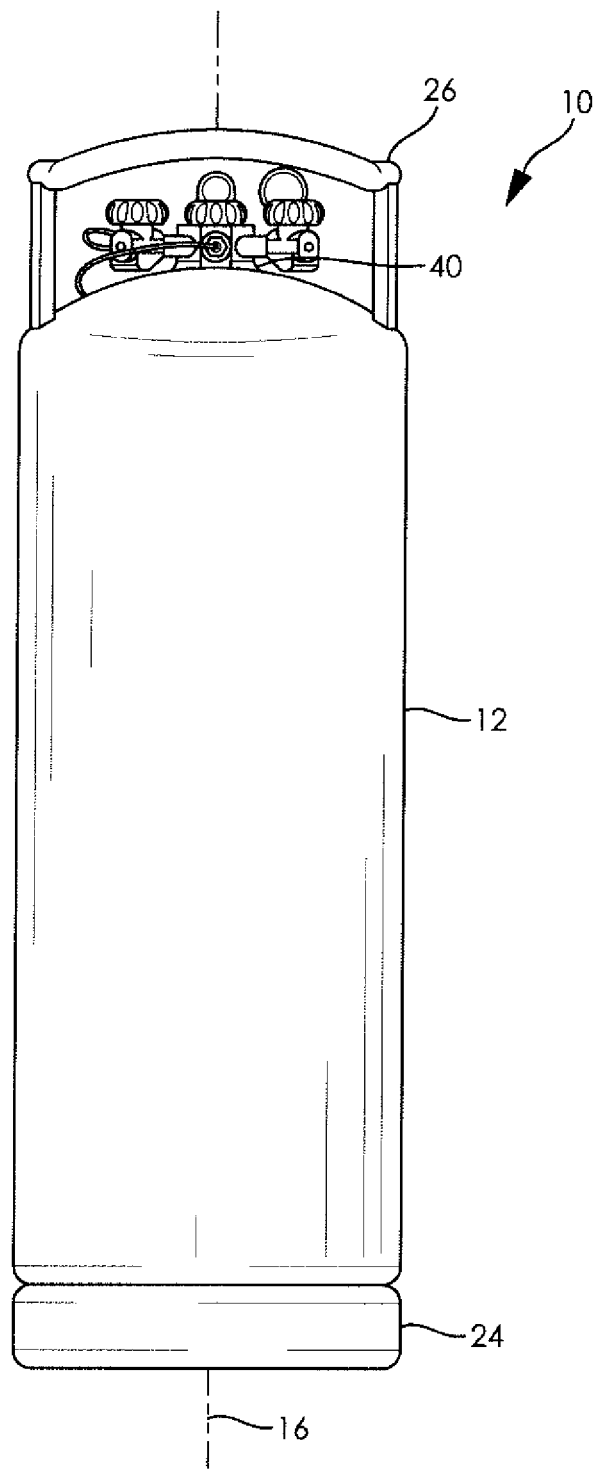
FIG. 1 is a front elevational view of a vertically-oriented cryogenic fluid cylinder having a liquid level gauge according to the present invention.

It should be understood that the appended drawings are not necessarily to scale, presenting a somewhat simplified representation of various preferred features illustrative of the basic principles of the invention. The specific design features of the liquid level gauges and the cryogenic fluid storage vessels as disclosed herein, including, for example, specific dimensions, orientations, locations, and shapes of the various components, will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the cryogenic fluid storage vessels illustrated in the drawings.

DETAILED DESCRIPTION OF CERTAIN PREFERRED EMBODIMENTS

It will be apparent to those skilled in the art, that is, to those who have knowledge or experience in this area of technology, that many uses and design variations are possible for the improved liquid level gauges and the cryogenic fluid storage vessels disclosed herein. The following detailed discussion of various alternative and preferred embodiments will illustrate the general principles of the invention with regard to a vertically-oriented cryogenic fluid cylinder. Other embodiments suitable for other applications will be apparent to those skilled in the art given the benefit of this disclosure.

Referring now to the drawings, FIGS. 1 to 4 illustrate a cryogenic fluid vessel or container 10 in the form of a vertically-oriented cryogenic fluid cylinder according to the present invention. The cryogenic fluid cylinder 10 is designed for the storage and transportation of cryogenic fluids such as, for example, liquid nitrogen, liquid oxygen, liquid argon, liquid carbon dioxide, liquid nitrous oxide, and the like. The illustrated cryogenic fluid cylinder 10 includes a cylindrically-shaped outer vessel or tank 12 having a laterally-extending diameter 14 and a vertically-extending central longitudinal axis 16 perpendicular to the lateral diameter 14, a cylindrically shaped inner vessel or tank 18 having a laterally-extending diameter 20 and a vertically-extending central longitudinal axis 22 perpendicular to the lateral diameter 20 and located within the outer vessel 12 and coaxial with the central longitudinal axis 16 of the outer vessel 12, a foot ring 24 secured to the bottom of the outer vessel 12, and a handling or protective ring 26 secured to the top of the outer vessel 12. The illustrated outer and inner vessels 12, 18 have elongate longitudinal lengths such that the longitudinal lengths of the illustrated outer and inner vessels 12, 18 are about 2.5 to 3.0 times larger than the lateral diameters of the illustrated outer and inner vessels 12, 18 but any other suitable size can alternatively be utilized. The outer and inner vessels 12, 18, the foot ring 24, and the handling ring 26 preferably each comprise stainless steel but any other suitable material can alternatively be utilized. The illustrated inner vessel 18 has a hollow interior space 28 for containing the cryogenic fluid and is supported within the outer vessel 12 to minimize heat communication between the outer and inner vessels 12, 18 while providing adequate support of the inner vessel 18. The illustrated inner vessel 18 is at least partially supported by a support tube 28 extending from the top of the outer vessel 12 to the top of the inner vessel 18 within the outer vessel 12 and communicating an opening 12a in the top of the outer vessel 12 with an opening 18a in the top of the inner vessel 18. A vacuum is present in the gap or space 32 between the illustrated outer and inner vessels 12, 18. Additionally or alternatively, cryogenic thermal insulation and/or vacuum getters can be provided to assist thermally insulating the inner vessel.

Figure 2:
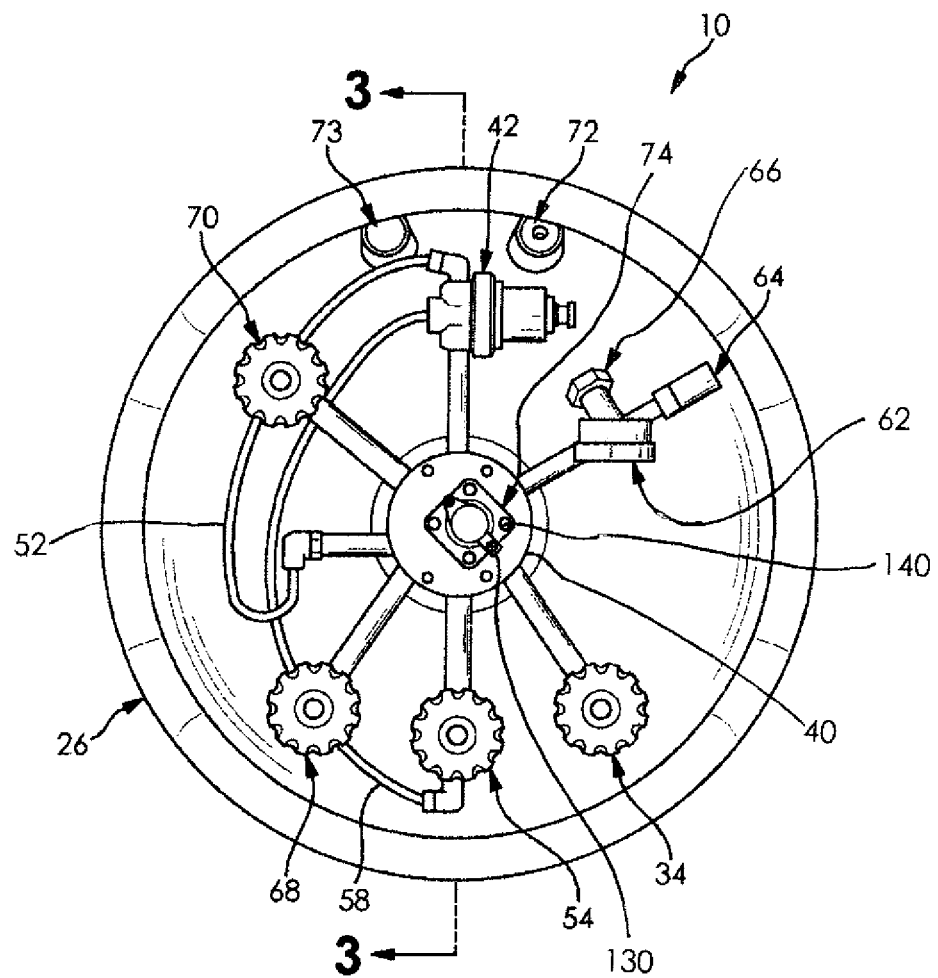
FIG. 2 is an enlarged top view of the cryogenic fluid cylinder of FIG. 1 showing user controls and indicators.
Figure 3:
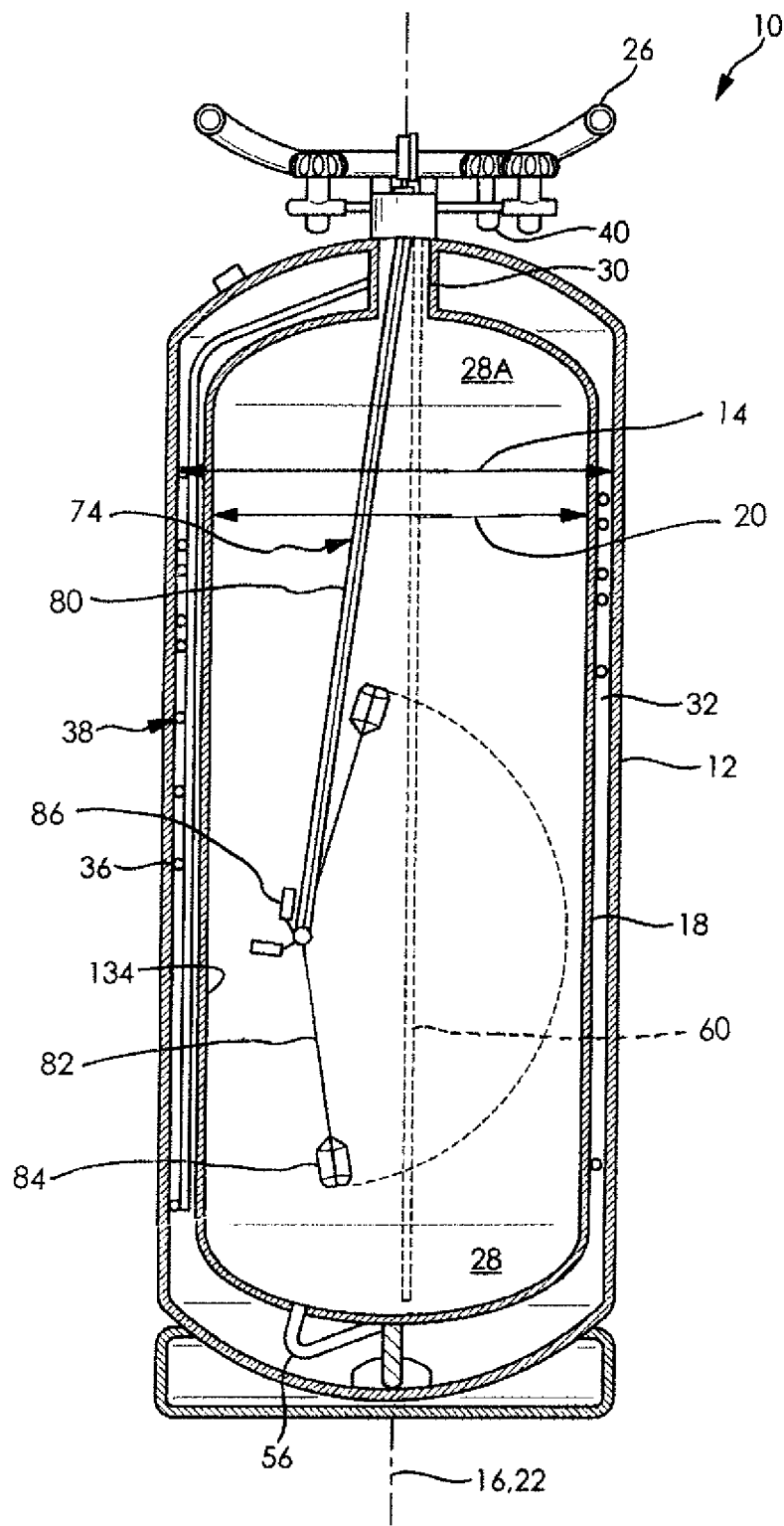
FIG. 3 is cross-sectional view of the cryogenic fluid cylinder of FIGS. 1 and 2 taken along line 3-3 of FIG. 2.
Figure 4:
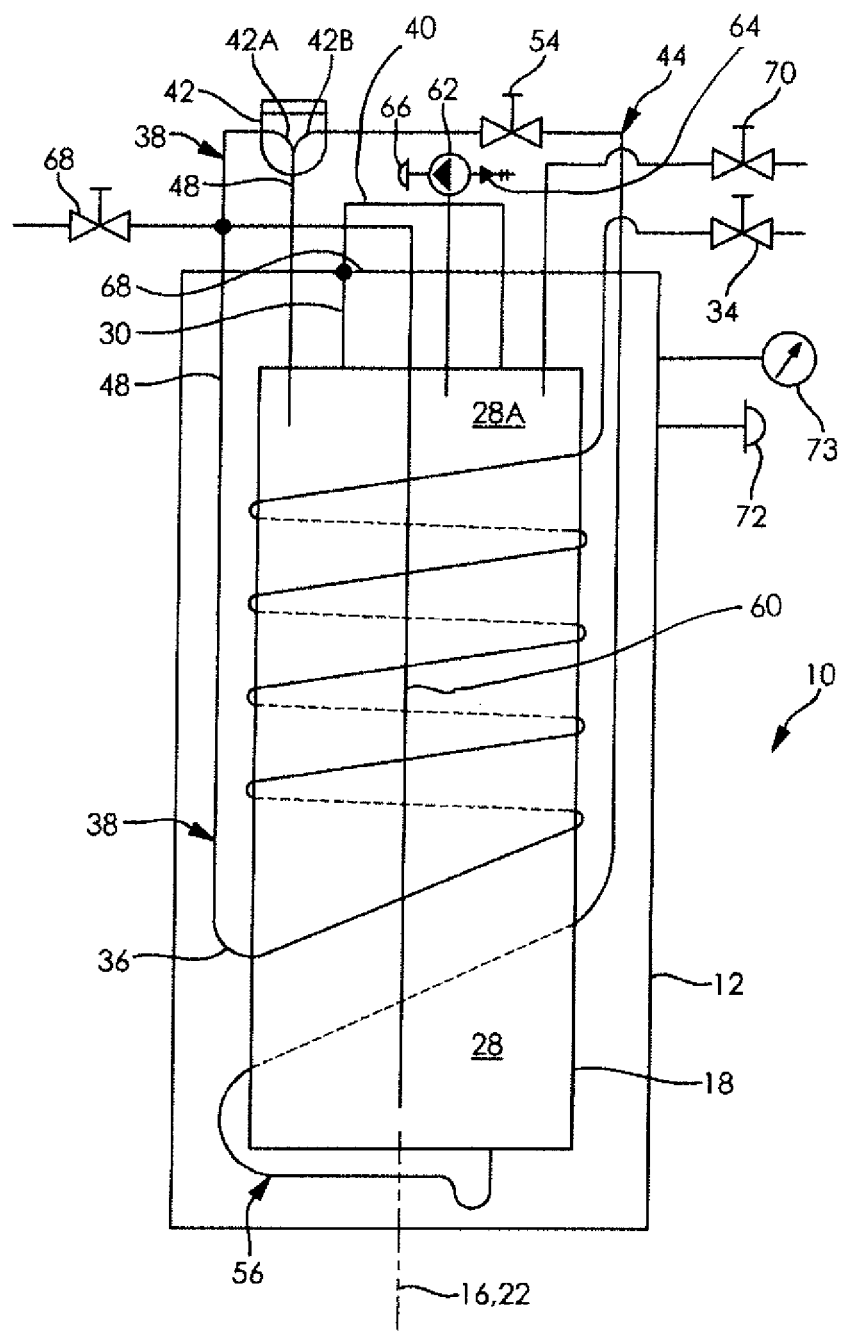
FIG. 4 is schematic view of plumbing of the cryogenic fluid cylinder of FIGS. 1 to 3.
Figure 5:
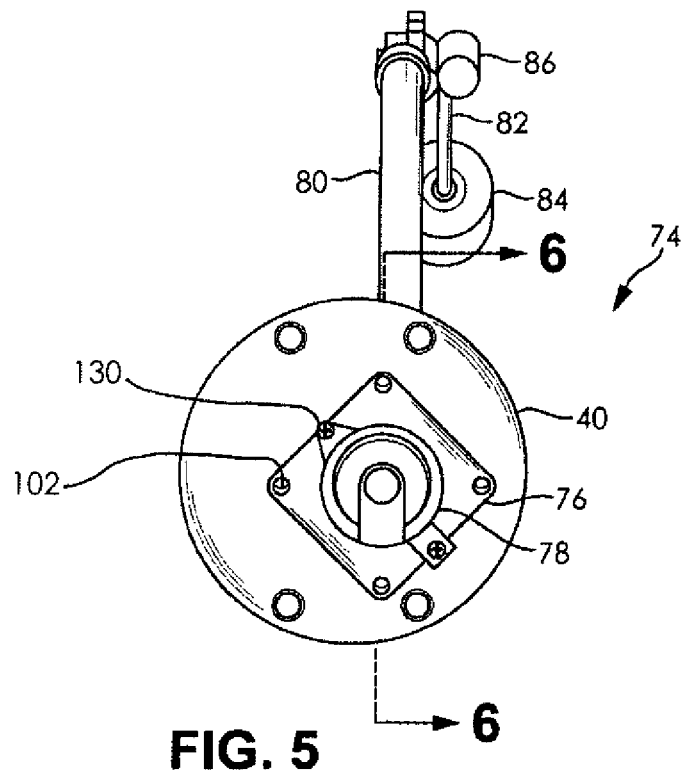
FIG. 5 is an enlarged top plan view of the cryogenic fluid cylinder of FIGS. 1 to 4, wherein all components have been removed for clarity except for a manifold and the liquid level gauge.
Figure 6:
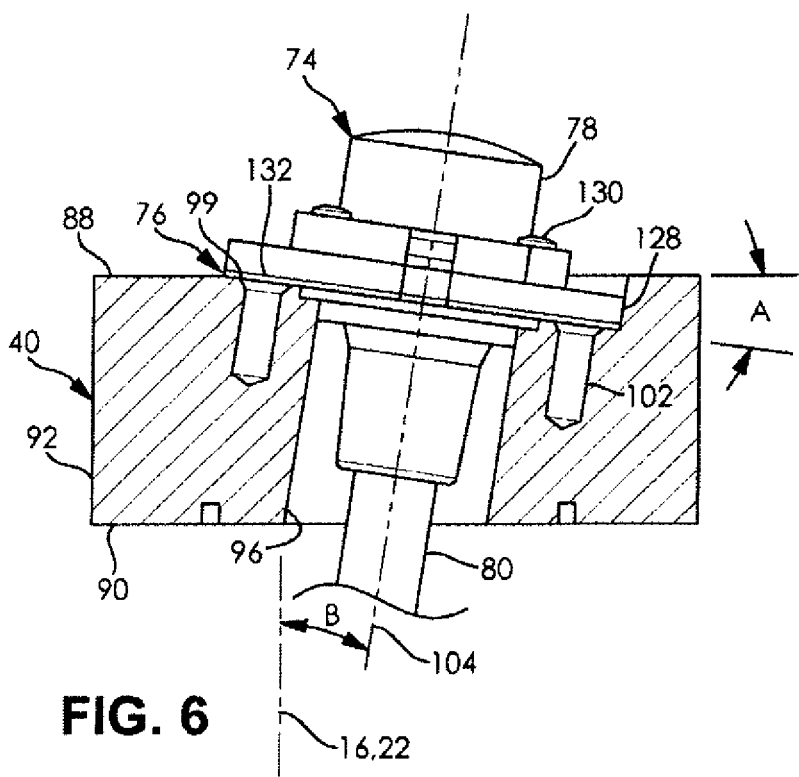
FIG. 6 is a cross sectional view taken along line 6-6 of FIG. 5.

As best shown in FIG. 2, all operating controls and indicators of the illustrated cryogenic fluid cylinder 10 are located at the top of the outer vessel 12. The operating controls and indicators enable suppliers, maintenance personnel, and customers or end users to control operations of the cryogenic fluid cylinder 10 as described in more detail hereinbelow.

Figure 7:
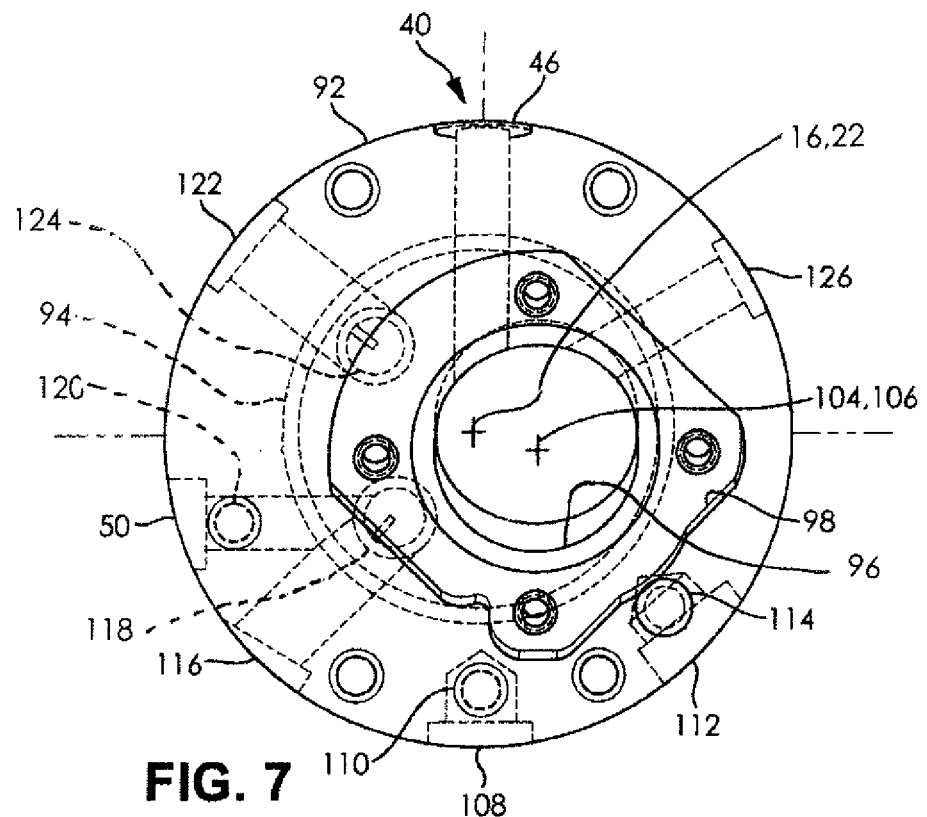
FIG. 7 is an enlarged top plan view of the manifold of the cryogenic fluid cylinder of FIGS. 1 to 6.
Figure 8:
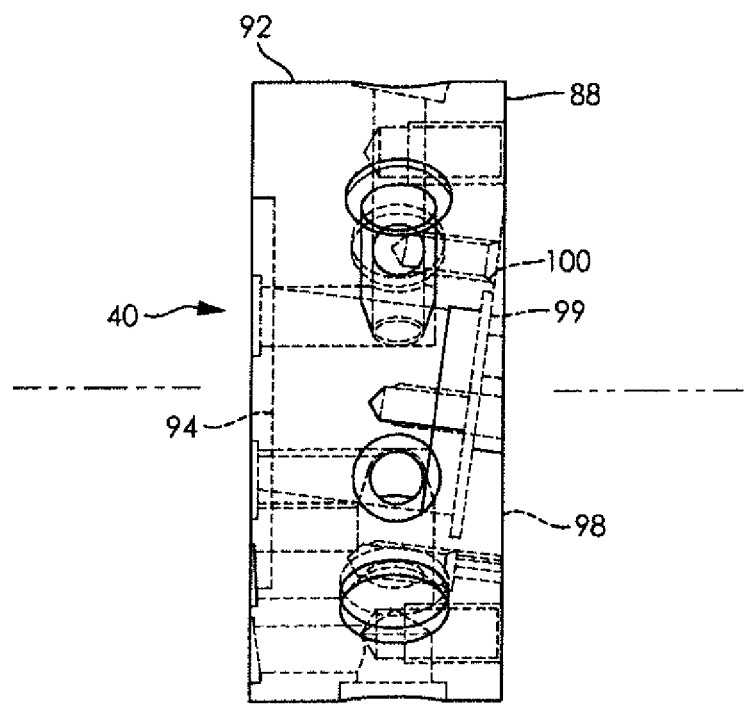
FIG. 8 is a right-side elevational view of the manifold of FIG. 7.

A manually-operable gas-use valve 34 is located at the top of the illustrated outer vessel 12 and is in communication with a vaporizer coil of an economizer circuit 38 through a manifold or "knuckle" 40 (best shown in FIGS. 7 and 8). The illustrated manifold 40 is located outside the outer vessel 12 and is rigidly secured to the outer vessel 12 at the top opening 12a of the outer vessel 12 so that it is in communication with the top of the inner vessel 18. The manifold 40 closes and seals the top opening 12a in the outer vessel 12 except for passages therein as discussed in more detail hereinafter. The gas-use valve 34 is opened and closed by the customers or end users to selectively supply pressurized cryogenic gas from the cryogenic fluid cylinder 10 to an external device. The illustrated gas-use valve 34 is provided with a suitable fitting for attachment of a gas supply line for connecting the gas-use valve 34 with the external device to be supplied with the cryogenic gas from the cryogenic fluid cylinder 10.

An economizer or control regulator 42 is located at the top of the illustrated outer vessel 12 for regulating the economizer circuit 38 and a pressure building circuit 42 to automatically maintain desired operating pressures within the inner vessel 12. The economizer regulator 42 is in fluid flow communication with an upper portion of the inner vessel 18 via a regulator port 46 of the manifold 40. An economizer portion 42A of the economizer regulator 42 is also in fluid flow communication with an economizer tube 48 extending to the vaporizer coil 36 of the economizer circuit 38 via an economizer port 50 of the manifold 40. The illustrated economizer regulator 42 is connected to the economizer port 50 with external copper tubing 52 but can alternatively connected in any other suitable manner. The economizer regulator 42 is also in fluid flow communication with a manually-operable pressure building valve 54 which is connected to a pressure building coil 56 of the pressure building circuit 44. The illustrated economizer regulator 42 is connected to the pressure building valve 54 with external copper tubing 58 but can alternatively connected in any other suitable manner. The economizer regulator 42 is adjusted by the supplier or maintenance personnel to set an economizer pressure and a pressure building pressure. The illustrated economizer regulator 42 automatically sets the economizer pressure setting a predetermined amount higher than the pressure building setting such as, for example, about 15 psig but any other suitable type of economizer regulator 42 can alternatively be utilized.

When it is desired to release pressurized cryogenic gas from the illustrated inner vessel 12, the customers or end users open the gas-use valve 34. If the operating pressure within the inner vessel 12 is greater than the economizer pressure setting of the economizer regulator 42, the economizer regulator 42 is automatically open to communicate a head space 28A, located at the top of the interior space 28, within the inner vessel 18 with the economizer tube 48 of the economizer circuit 38 so that pressurized cryogenic gas flows from the head space 28A within the inner vessel 18 to the economizer regulator 42 through the manifold 40, from the economizer regulator 42 to the economizer tube 48 through the manifold 40, through the vaporizer coil 36 within the outer vessel 12, from the vaporizer coil 36 to the gas-use valve 34 through the manifold 40, and through the gas-use valve 34 for delivery to the external device through the gas supply line secured between the gas-use valve 34 and the external device. As pressurized cryogenic gas is released, the operating pressure within the inner vessel 18 is reduced. If the operating pressure within the inner vessel 18 drops to the economizer pressure setting of the economizer regulator 42, the economizer regulator 42 is automatically closed and cryogenic liquid flows up a liquid tube 60 from the bottom of the inner vessel 18 to the economizer tube 48 via the manifold 40, through the vaporizer coil 36 within the outer vessel where it is vaporized, from the vaporizer coil 36 to the gas-use valve 34 through the manifold 40, and through the gas-use valve 34 for delivery to the external device through the gas supply line secured between the gas-use valve 34 and the external device. If the operating pressure within the inner vessel 18 drops to the pressure building setting of the economizer regulator 42, the economizer regulator 42 automatically opens to connect the pressure building valve 54 with the head space 28A within the inner vessel 18 so that, when the pressure building valve 54 is open, cryogenic liquid flows from the bottom of the inner vessel 18 to the pressure building coil 56, through the pressure building coil 56 within the outer vessel 12 where it is vaporized, from the pressure building coil 56 to the pressure building valve 54 through the manifold 40, from the pressure building valve 54 to the economizer regulator 42 through the tubing 58, and from the economizer regulator 42 to the head space 28A within the inner vessel 18 through the manifold 40. When the operating pressure within the inner vessel 18 rises above the pressure build setting of the economizer regulator 42, the economizer regulator 42 closes to stop flow through the pressure building circuit 44. It is noted that the illustrated vaporizer coil 36 and the illustrated pressure building coil 56 are each located between the outer and inner vessels 12, 18 and attached to the inside of the outer vessel 12 but any other suitable configuration can alternatively be utilized. When it is desired to stop release of cryogenic gas from the inner vessel 18, the customer or end user closes the gas-use valve 34.

The manually-operable pressure building valve 54 is located at the top of the illustrated outer vessel 12 and can be selectively operated to isolate the economizer regulator 42 from the pressure building coil 56. The pressure building valve 54 is in fluid flow communication with an outlet of the pressure building coil 56 and is in fluid flow communication with the pressure building portion 42B of the economizer regulator 42. When the pressure building valve 54 is open, the pressure building circuit 44 automatically operates as described above to raise the operating pressure within the inner vessel 18. When the pressure building valve 54 is closed, the pressure building circuit 44 does not operate.

A pressure gauge 62 is located at the top of the illustrated outer vessel 12 and is in fluid flow communication with the head space 28A of the inner vessel 18 through the manifold 40. The pressure gauge 62 displays a visual indication of the current operating pressure within the inner vessel 18. The illustrated pressure gauge 62 is a mechanical dial gauge but it is noted that any other suitable type of pressure gauge can alternatively be utilized.

A pressure relief device or valve 64 is located at the top of the illustrated outer vessel 12 and is in fluid flow communication with the head space 28A within the inner vessel 18 through the manifold 40. The pressure relief valve 64 automatically opens when the operating pressure within the inner vessel 18 reaches a predetermined maximum operating pressure. When open, the pressure relief valve 64 vents cryogenic gas from the inner vessel 18 to atmosphere via the manifold 40. A burst device or disc 66 is also located at the top of the illustrated outer vessel 12 and is in fluid flow communication with the head space 28A within the inner vessel 18 through the manifold 40. The burst device 66 ruptures to release excess pressure at a predetermined maximum pressure greater than the predetermined maximum pressure of the pressure release device 64 and, when ruptured, indicates that the pressure relief device 64 failed to properly operate. When ruptured, the burst device 66 vents cryogenic gas from the inner vessel 18 to atmosphere through the manifold 40. The pressure relief device 64 and the burst device 66 can be of any suitable type.

A manually-operable liquid-use valve 68 is located at the top of the illustrated outer vessel 12 and is in fluid flow communication with the outlet of the liquid withdrawal tube 60 located within the inner vessel 18 through the manifold 40. The liquid-use valve 68 is opened and closed by the customer or end user to selectively supply cryogenic liquid from the inner vessel 18 to an external device. The illustrated liquid-use valve 68 is provided with a suitable fitting for attachment of a liquid supply line for connecting the liquid-use valve 68 with the external device to be supplied with the cryogenic liquid from the cryogenic fluid cylinder 10.

A manually-operable vent valve 70 is located at the top of the illustrated outer vessel 12 and is in fluid flow communication with the inner vessel 18 through the manifold 40. The vent valve 70 is opened and closed by maintenance personnel to control liquid filling and/or gas withdrawal. The illustrated vent valve 70 is provided with a suitable fitting for attachment of a transfer line to the vent valve 70 when desired.

The top of the illustrated outer vessel 12 is also proved with a pump-out or seal plug 72. The pump-out plug 72 protects the outer vessel 12 from over pressurization. The illustrated pump-out plug 72 is secured through the outer vessel 18 at the rear side of the top of the cryogenic fluid cylinder 1 includes a base and a plug. The illustrated pump-out plug 72 is configured so that the plug remains in the base and seals the opening 12a in the outer vessel 12 over a predetermined range of pressures within the outer vessel 12 but the plug is pushed out of the base at a predetermined pressure to prevent rupture of the outer vessel 12 due to over pressurization. The top of the illustrated outer vessel 12 is also proved with a vacuum gauge port 77 for determining the level of vacuum in the gap 32 between the outer and inner vessels 12, 18. The vacuum gauge port can be of any suitable type.

As best shown in FIGS. 2, 3, 5 and 6, a liquid level gauge 74 is secured to the top of the manifold 40 and extends down into the inner vessel 18, through the manifold 40, the opening 12a in the top of the outer vessel 12, the inner vessel support tube 30, and the opening 18a in the top of the inner vessel 18, to provide an indication of liquid level within the inner vessel 12 that is viewable outside the outer vessel 12. The illustrated liquid level gauge 74 extends down to a lower portion of the inner vessel 18 where it can interact with cryogenic liquid in the lower portion of the inner vessel 18 to provide an indication of the level of the cryogenic liquid within the inner vessel 18. The illustrated liquid level gauge 74 is a float type or swing arm type liquid level gauge and includes a gauge head 76 secured to the top of the manifold 40, a level indicator 79 (such as, for example, a mechanical dial) secured to the top of the gauge head 76 and viewable from the outside of the cryogenic fluid cylinder 10, a rigid, fixed-length support arm 80 extending from a lower side of the gauge head 76 and extending into the inner vessel 18, a rigid, fixed length swing or pivot arm 82 pivotably secured to a lower end of the support arm 80 and operatively connected to the level indicator 78 so that angular position of the swing arm 82 provides visual indication of liquid level within the inner vessel 18 on the level indicator 78, a float 84 secured to a first or forward end of the swing arm 82 and configured to pivot the swing arm 82 as level of the liquid within the inner vessel changes, and a counterweight 86 secured to a second or rearward end of the swing arm 82 opposite the float 84. In the illustrated embodiment, a gear connection is provided between the swing arm 82 and a rod extending to the level indicator 78, which is a spring-loaded mechanical level indicating dial, that translates the pivoting motion of the swing arm 82 into longitudinal movement of the rod in a known manner. Connected in this manner, the rod moves the spring-loaded, mechanical level indicating dial in a desired manner to give a visual indication of the liquid level within the inner vessel 18 based on the pivoting motion of the swing arm 82. It is noted, however, that any other suitable structure or method of translating the pivoting motion of the swing arm 82 to the level indicator 78 can alternatively be utilized and/or any other suitable type of level indicator 78 can alternatively be utilized. The float 84, which is buoyant in the cryogenic liquid, pivots the swing arm 82 as the level of the cryogenic liquid rises and lowers and the pivoting movement of the swing arm 82 adjusts the visual level indication on the level indicator 78.

As best shown in FIGS. 7 and 8, the illustrated manifold 40 is cylindrical shaped having a planar upper surface 88 to be perpendicular to the vertically-extending central longitudinal axis 22 of the inner vessel 18, a planar lower surface 90 opposite the upper surface 88 to be perpendicular to the vertically-extending central longitudinal axis 22 of the inner vessel 18, and a cylindrically-shaped outer peripheral side surface 92 connecting and substantially perpendicular to the upper and lower surfaces 88, 90. The manifold 40 is sized and shaped to be secured to the top of the outer vessel 12 and to close and seal the opening 12a in the top of the outer vessel 12. The illustrated lower surface 90 is provided with a centrally located counter bore 94 normal or perpendicular to the lower surface 90 and sized and shaped for closely receiving the support tube 30 for the inner vessel 18.

A main passage 96 extends through the illustrated manifold 40 from the upper surface 88 to the lower surface 90 within the counter bore 96 on the lower surface 90 so that when the support tube 30 is secured between the inner vessel 18 and the manifold 40, the main passage 96 is in fluid flow communication with the head space 28A of the inner vessel 18. The illustrated upper surface 88 is provided with a cavity 98 about the main passage 96 which is sized and shaped to receive the gauge head 76 and cooperate with the gauge head 76 to close and seal the upper end of the main passage 96. A bottom surface 99 of the cavity 98 is provided with a plurality of spaced-apart threaded fastener openings 100 surrounding the main passage 96 for securing the gauge head 76 of liquid level gauge 74 thereto with mechanical fasteners 102. The illustrated bottom surface 99 of the cavity 98 forms an acute angle A (best shown in FIG. 6) with the upper surface 88 and thus the vertically-extending central longitudinal axis 22 of the inner vessel, which is normal or perpendicular to the upper surface 88, so that the central longitudinal axis 104 of the liquid level gauge support arm 80, which extends normal or perpendicular to the bottom surface 99 of the cavity 98 forms an acute angle B (best shown in FIG. 6) with the vertically-extending central longitudinal axis 22 of the inner vessel 18. The central longitudinal axis of the support arm 104 preferably forms an acute angle (B) with the vertically-extending central longitudinal axis 22 of the inner vessel 18 in the range of about 6 degrees to about 8.5 degrees.

The illustrated bottom surface 99 of the cavity 98 forms an acute angle A of about 7.25 degrees with the upper surface 88 and thus the vertically-extending central longitudinal axis 22 of the inner vessel 18 so that the central longitudinal axis 104 of the support arm 80 forms an acute angle B of about 7.25 degrees with the vertically-extending central longitudinal axis 22 of the inner vessel 18. It is noted that any other suitable acute angles can be utilized depending on the dimensions of the components. The illustrated main passage 96 extends normal or perpendicular to the bottom surface 99 of the cavity 98 and thus also forms an acute angle with the vertically-extending central longitudinal axis 22 of the inner vessel 18 (best shown in FIG. 6). The illustrated main passage 96 is also offset from the central longitudinal axis 106 of the manifold 40 and thus the central longitudinal axes 16, 22 of the outer and inner vessels 12, 18 (best shown in FIG. 7) so that the length and thus the pivot range of the swing arm 82 can be maximized while accommodating other components access into to the inner vessel 18 through the inner vessel support tube 30. The illustrated main passage is offset in both the lateral left/right and forward/rearward directions but any other suitable offset can alternatively be utilized.

The front of the illustrated manifold side surface 92 is provided with a pressure building port 108 for connection of the pressure building valve 54. The pressure building port 108 is connected for fluid flow communication, via an internal passage, to a pressure building coil port 110 on the lower surface 90, outside the support tube counter bore 94, for connection of the outlet of the pressure building coil 56 located within the outer vessel 12. Adjacent to the pressure building port 108, the front of the illustrated manifold side surface 92 is provided with a gas port 112 for connection of the gas-use valve 34. The gas port 112 is connected for fluid flow communication, via an internal passage, to a vaporizer outlet port 114 on the lower surface 90, outside the support tube counter bore 94, for connection of the outlet of the vaporizer coil 36 located within the outer vessel 12. Adjacent to the pressure building port 108 opposite the gas port 112, the front of the illustrated manifold side surface 92 is provided with a liquid port 116 for connection of the liquid-use valve 68. The liquid port 116 is connected for fluid flow communication, via an internal passage, to a withdrawal tube port 118 on the lower surface 90, within the support tube counter bore 94, for connection of the outlet of the liquid withdrawal tube 60 located within the inner vessel 18. Adjacent to the liquid-use port 116 opposite the pressure building port 108, the front of the illustrated manifold side surface 92 is provided with the economizer tube port 50 for connection of the economizer portion 42A of the economizer regulator 42. The economizer tube port 50 is connected for fluid flow communication, via an internal passage, to a vaporizer inlet port 120 on the lower surface 90, within the support tube counter bore 94, for connection of the inlet of the economizer tube 48 located within the outer vessel 12. It is noted that the inner passage also connects the economizer tube port 50 in fluid flow communication with the withdrawal tube port 118. Thus, the liquid port 116 and the withdrawal tube port 118 are each in fluid flow communication with each of the economizer tube port 50 and the vaporizer inlet port 120.

The rear of the illustrated manifold side surface 92 is provided with the pressure building regulator port 46 for connection of the economizer regulator 42. The pressure regulator port 46 is connected for fluid flow communication, via an internal passage, to the main passage 96 and thus the head space 28A of the inner vessel 18. Adjacent to the regulator port 46, the rear of the illustrated manifold side surface 92 is provided with a vent port 122 for connection of the vent valve 70. The vent port 122 is connected for fluid flow communication, via an internal passage, to a port 124 on the lower surface 90, within the support tube counter bore 94, to be in fluid flow communication with the head space 28A of the inner vessel 18. Adjacent to the regulator port 46 opposite the vent port 122, the rear of the illustrated manifold side surface 92 is provided with a relief port 126 for connection of the pressure gauge 62, the pressure relief device 64, and the burst device 66. The relief port 126 is connected for fluid flow communication, via an internal passage, to the main passage 96 and thus the head space 28A of the inner vessel 18. It is noted that the manifold 40 can alternatively have any other suitable configuration.

The illustrated gauge head 76 has a flange 128 with planar and parallel upper and lower surfaces and is configured to cooperate with the cavity 98 of the manifold 40 to secure and seal the liquid level gauge 74 to the manifold 40. The illustrated flange 138 is also configured to secure the level indicator 78 on an upper side thereof and is provided with threaded openings for receiving mechanical fasteners 130 that extend through openings 131 in the level indicator 78 to the openings 129 in the gauge head flange 128. The illustrated flange 128 of the gauge head 76 is provided with a gasket 132 to seal the connection between the gauge head 76 and the manifold 40 but any other suitable method of sealing the connection can alternatively be utilized. The illustrated flange 128 also has an opening for operably connecting the level indicator 78 to the swing arm 82. As best shown in FIG. 9, the illustrated support arm 80 is rigid and straight between the gauge head 76 and the swing arm 82, and has a fixed-length. The illustrated support arm 80 is rigidly secured to the gauge head 76 against relative motion thereto and perpendicularly extends from a lower side of the gauge head 76 in a cantilevered manner. Configured in this manner, the central longitudinal axis 104 of the support arm 80 forms the acute angle B with the vertically-extending central longitudinal axis 22 of the inner vessel 18 and thus an inner surface 134 of the sidewall of the inner vessel 18. The acute angle B is preferably in the range of about 6 degrees to about 8.5 degrees. The illustrated acute angle B is about 7.25 degrees but any other suitable angle can alternatively be utilized. The acute angle 13 positions the lower end of the swing arm 82 closer to the inner surface 134 of the sidewall of the inner vessel 18 than if the support arm 80 was extending through the inner vessel support tube 30 substantially vertical and parallel or coaxial with the vertically-extending central longitudinal axis 22 of the inner vessel 18. Configured in this manner, an outer or upper end of the support arm 80 secured to the gauge head 76 is located closer to the central longitudinal axis 22 of the inner vessel 18 than the inner end of the support arm 80 secured to the swing arm 82 so that the support arm 80 can extend through the inner vessel support tube 30 and also have its lower end close to the inner surface 134 of the inner vessel side wall. With the lower end of the of the support arm 80 positioned closer to the inner surface 134 of the inner vessel side wall, a first or float portion of the swing arm 82 can have a longer length and thus pivot over a larger portion of the longitudinal length of the inner vessel 18 to indicate a greater range of liquid levels within the inner vessel 18. The illustrated swing arm 82 is sized so that the first or float portion extending from the pivot connection 136 to the float 84 is substantially longer than a second or counterweight portion extending from the pivot connection 136 to the counterweight 86. The illustrated swing arm 82 is pivotably secured to the inner or lower end of the support arm 80 at the pivot connection 136. The support arm 80 and the swing arm 82 are each sized and configured so that both ends of the swing arm 82 pass near, but do not engage, the side wall of the inner vessel 18 and pivots over an arc to position the float 84 over a desired longitudinally-extending portion of the longitudinal length of the inner vessel 18. The illustrated swing arm 82 pivots over an arc of about 157.5 degrees but any other suitable arc can alternatively be utilized.

The illustrated float 84 is secured to a first or forward end of the swing arm 82 opposite the counterweight 86. The float 84 can be of any suitable type and can comprise any suitable material so that the float 84 operates in the desired manner to rise and lower with the cryogenic fluid stored in the inner vessel 18 as level of the cryogenic fluid changes. The illustrated float 84 comprises a material that is strong enough to handle thermal and mechanical loading, nonreactive with the cryogenic fluid, and buoyant enough to float in the cryogenic liquid. The illustrated float 84 is also small enough to fit through the support tube 30 and the top openings 12a, 18a of the outer and inner vessels 12, 18. The illustrated float 84 comprises a material that is adequately buoyant in liquid oxygen, liquid nitrogen, liquid carbon dioxide, and liquid argon despite their different liquid densities so that the cryogenic fluid cylinder 10 can be selectively utilized to hold any of the cryogenic fluids. It is noted, however, that the float 84 can alternatively comprise a material that is adequately buoyant in any other quantity of the cryogenic fluids (such as, for example only one) and/or is adequately buoyant in any other cryogenic fluids.

The illustrated counterweight 86 is secured to a second or rearward end of the swing arm 82 opposite the float 84. The counterweight 86 can be of any suitable type and any suitable weight, and can comprise any suitable material so that the counterweight 86 balances the swing arm 82 and the float 84 operates in the desired manner to rise and lower with the cryogenic fluid stored in the inner vessel 18 as the level of the cryogenic fluid within the inner vessel 18 changes.

The illustrated level indicator 78 is secured to the top of the gauge head 76 with the mechanical fasteners 130 so that the level indicator 78 is viewable from the outside of the cryogenic fluid cylinder 10. As best shown in FIG. 10, the illustrated level indicator 78 displays an approximate level of the cryogenic liquid in the inner vessel 18 as a fraction of a full desired level of cryogenic fluid within the inner vessel 18. The illustrated level indicator 76 displays empty, ¼, ½, ¾, and full but any other suitable fractions or any other suitable visual indication of the liquid level within the inner vessel 18 can alternatively be utilized.

The illustrated liquid level gauge 74 is also configured so that the support arm 80, the swing arm 82, the float 84, and the counterweight 86 are insertable through the main passage 96 in the manifold 40, the inner vessel support tube 30, and the top opening of the inner vessel 18 during installation as a sub-assembly. To install the liquid level gauge 74 to the cryogenic fluid cylinder 10, the float 84 and the first portion of the swing arm 82 are first inserted straight through the main passage 96 in the manifold 40, the inner vessel support tube 30, and the top opening 18a of the inner vessel 18 until the pivot connection 136 of the swing arm 82 nears the upper surface 88 of the manifold 40. The liquid level gauge 74 is then lifted or rotated so that the support arm 80 is substantially vertical and can be pushed straight down into the inner vessel 18. Once the support arm 80 is near full insertion, the liquid level gauge 74 is then rotated again until it is at its desired acute angle B with the vertically-extending central longitudinal axis 22 of the inner vessel 18 and the gauge head 76 engages the bottom surface 99 of the cavity 98 in the manifold 40. The gauge head 76 is then secured thereto with the mechanical fasteners 102.

It is noted that each of the features and variations of the above disclosed embodiments can be used in any combination with each of the other embodiments.

From the foregoing disclosure it is apparent that the liquid level gauges of the cryogenic fluid storage vessels of the present invention are relatively accurate, relatively low cost to produce, and provide an indication of the liquid level within the cryogenic fluid storage vessel over a larger range of the tank height. Thus, they are an improvement over prior liquid level gauges for cryogenic fluid storage vessels.

From the foregoing disclosure and detailed description of certain preferred embodiments, it is also apparent that various modifications, additions and other alternative embodiments are possible without departing from the true scope and spirit of the present invention. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A cryogenic fluid storage vessel comprising, in combination:

an inner vessel for holding cryogenic fluid;
wherein the inner vessel is cylindrical shaped having a diameter and a central longitudinal axis perpendicular to the diameter;
an outer vessel surrounding the inner vessel and forming an insulating space therebetween;
a liquid level gauge including a gauge head secured to the outer vessel, a level indicator viewable from outside of the outer vessel, a support arm extending from the gauge head and extending into the inner vessel, a swing arm pivotably secured to a lower end of the support arm and operatively connected to the level indicator so that angular position of the swing arm provides an indication of liquid level within the inner vessel on the level indicator, and a float secured to the swing arm and configured to pivot the swing arm as level of the liquid within the inner vessel changes; and
wherein a central longitudinal axis of the support arm forms an acute angle with the central longitudinal axis of the inner vessel.

2. The cryogenic fluid cylinder according to claim 1, wherein the float is secured to a first end of the swing arm, and a counterweight is secured to a second end of the swing arm opposite the float.

3. The cryogenic fluid cylinder according to claim 1, wherein an outer end of the support arm secured to the gauge head is located closer the central longitudinal axis of the inner vessel than the inner end of the support arm secured to the swing arm.

4. The cryogenic fluid cylinder according to claim 1, wherein the support arm is substantially straight between the gauge head and the swing arm.

5. The cryogenic fluid cylinder according to claim 1, wherein the support arm extends from a location on the gauge head offset from the central longitudinal axis of the inner vessel.

6. The cryogenic fluid cylinder according to claim 1, wherein the float is operably buoyant in liquid oxygen, liquid nitrogen, liquid carbon dioxide, and liquid argon.

7. A vertically-oriented cryogenic fluid cylinder comprising, in combination:

an inner vessel for holding cryogenic fluid;
wherein the inner vessel is cylindrical shaped having a laterally-extending diameter and a vertically-extending central longitudinal axis perpendicular to the lateral diameter;
an outer vessel surrounding the inner vessel and forming an insulating space therebetween;
wherein the outer vessel is cylindrical shaped having a laterally-extending diameter and a vertically-extending central longitudinal axis perpendicular to the lateral diameter and coaxial with the central longitudinal axis of the inner vessel;
a liquid level gauge including a gauge head secured to a top of the outer vessel, a level indicator viewable from outside of the outer vessel, a support arm extending from the gauge head and extending down into the inner vessel, a swing arm pivotably secured to a lower end of the support arm and operatively connected to the level indicator so that angular position of the swing arm provides an indication of liquid level within the inner vessel on the level indicator, and a float secured to the swing arm and configured to pivot the swing arm as level of the liquid within the inner vessel changes; and
wherein a central longitudinal axis of the support arm forms an acute angle with the central longitudinal axis of the inner vessel.

8. The cryogenic fluid cylinder according to claim 7, wherein the float is secured to a first end of the swing arm, and a counterweight is secured to a second end of the swing arm opposite the float.

9. The cryogenic fluid cylinder according to claim 7, wherein an outer end of the support arm secured to the gauge head is located closer the central longitudinal axis of the inner vessel than the inner end of the support arm secured to the swing arm.

10. The cryogenic fluid cylinder according to claim 7, wherein the support arm is substantially straight between the gauge head and the swing arm.

11. The cryogenic fluid cylinder according to claim 7, wherein the support arm extends from a location on the gauge head offset from the central longitudinal axis of the inner vessel.

12. The cryogenic fluid cylinder according to claim 7, wherein the float is operably buoyant in liquid oxygen, liquid nitrogen, liquid carbon dioxide, and liquid argon.

* * * * *